(12) United States Patent  (10) Patent No.: US 9,170,892 B2
Nightingale et al.  (45) Date of Patent: Oct. 27, 2015

(54) SERVER FAILURE RECOVERY

(75) Inventors: Edmund B. Nightingale, Redmond, WA (US); Jeremy E. Elson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/116,270

(22) Filed: May 26, 2011

(65) Prior Publication Data

US 2011/0258488 A1  Oct. 20, 2011

Related U.S. Application Data

(63) Continuation-in-part of application No. 12/763,107, filed on Apr. 19, 2010, and a continuation-in-part of application No. 12/763,133, filed on Apr. 19, 2010, now Pat. No. 8,181,061, and a continuation-in-part of application No. 13/017,193, filed on Jan. 31, 2011.

(51) Int. Cl.
*G06F 15/173* (2006.01)
*G06F 11/16* (2006.01)
*G06F 11/20* (2006.01)

(52) U.S. Cl.
CPC ........ *G06F 11/1658* (2013.01); *G06F 11/2038* (2013.01)

(58) Field of Classification Search
CPC .................................................... G06F 15/173
USPC ............... 709/201, 2.21, 220–221; 714/15, 2, 714/4.12
See application file for complete search history.

(56) References Cited

U.S. PATENT DOCUMENTS 4,491,945 A  1/1985  Turner
4,780,870 A  10/1988  McHarg et al.
(Continued)

FOREIGN PATENT DOCUMENTS

CN  1871806  11/2006
EP  2192729  6/2010
(Continued)

OTHER PUBLICATIONS

Rhea et al., "Maintenance-Free Global Data Storage," Sep.-Oct. 2001 IEEE Internet Computing.*
(Continued)

*Primary Examiner* — Vivek Srivastava
*Assistant Examiner* — Sibte Bukhari
(74) *Attorney, Agent, or Firm* — Steve Wight; Judy Yee; Micky Minhas

(57) ABSTRACT

A metadata server configured to maintain storage assignment mappings in non-persistent storage is described herein. The tract storage assignment mappings associate servers with storage assignments, the storage assignments representing the data stored on the servers. Responsive to a failure, the metadata server receives the storage assignments from the servers and rebuilds the storage assignment mappings from the storage assignments. The metadata server is also configured to enable clients to operate during a recovery process for a failed server by providing the storage assignment mappings to the clients during the recovery process. Also during the recovery process, the replacement server for the failed server conditionally overwrites stored data with other data received from other servers as part of the recovery process. The replacement server conditionally overwrites based on version information associated with the data and version information associated with the other data, the version information being associated with one or more versions of the storage assignment mappings.

13 Claims, 7 Drawing Sheets

(56) References Cited

U.S. PATENT DOCUMENTS

| | | | |
|---|---|---|---|
| 5,305,320 A | 4/1994 | Andrews et al. | |
| 5,408,649 A | 4/1995 | Beshears et al. | |
| 5,423,046 A | 6/1995 | Nunnelley et al. | |
| 5,446,915 A | 8/1995 | Pierce | |
| 5,553,285 A | 9/1996 | Krakauer et al. | |
| 5,621,884 A | 4/1997 | Beshears et al. | |
| 5,663,951 A | 9/1997 | Danneels et al. | |
| 5,914,878 A | 6/1999 | Yamamoto et al. | |
| 5,938,732 A | 8/1999 | Lim et al. | |
| 5,970,232 A | 10/1999 | Passint et al. | |
| 6,230,252 B1 | 5/2001 | Passint et al. | |
| 6,424,979 B1 | 7/2002 | Livingston et al. | |
| 6,577,613 B1 | 6/2003 | Ramanathan | |
| 6,728,747 B1 | 4/2004 | Jenkins et al. | |
| 6,850,489 B1 | 2/2005 | Omi et al. | |
| 6,871,295 B2 | 3/2005 | Ulrich et al. | |
| 6,963,996 B2 | 11/2005 | Coughlin | |
| 7,076,555 B1 | 7/2006 | Orman et al. | |
| 7,107,606 B2 | 9/2006 | Lee | |
| 7,113,993 B1 | 9/2006 | Cappiello et al. | |
| 7,115,919 B2 | 10/2006 | Kodama | |
| 7,139,933 B2 | 11/2006 | Hsu et al. | |
| 7,165,256 B2 | 1/2007 | Boudnik et al. | |
| 7,171,491 B1 | 1/2007 | O'Toole et al. | |
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 | 7/2007 | Horn et al. | |
| 7,272,613 B2 | 9/2007 | Sim et al. | |
| 7,342,876 B2 | 3/2008 | Bellur et al. | |
| 7,356,213 B1 | 4/2008 | Cunningham et al. | |
| 7,383,288 B2 | 6/2008 | Miloushev et al. | |
| 7,433,332 B2 | 10/2008 | Golden et al. | |
| 7,437,407 B2 | 10/2008 | Vahalia et al. | |
| 7,496,233 B2 | 2/2009 | Kirihara et al. | |
| 7,577,817 B2 | 8/2009 | Karpoff et al. | |
| 7,610,348 B2 | 10/2009 | Kisley et al. | |
| 7,657,581 B2 | 2/2010 | Orenstein et al. | |
| 7,725,437 B2 | 5/2010 | Kirshenbaum et al. | |
| 7,756,826 B2 | 7/2010 | Bots et al. | |
| 7,769,843 B2 | 8/2010 | Neuse et al. | |
| 7,774,469 B2 | 8/2010 | Massa et al. | |
| 7,779,148 B2 | 8/2010 | Arimilli et al. | |
| 7,797,453 B2 | 9/2010 | Meijer et al. | |
| 7,801,994 B2 | 9/2010 | Kudo | |
| 7,805,580 B2 | 9/2010 | Hirzel et al. | |
| 7,817,880 B1 | 10/2010 | Drost et al. | |
| 7,840,136 B1 | 11/2010 | Cunningham et al. | |
| 7,916,703 B2 | 3/2011 | Yang et al. | |
| 7,930,595 B2 | 4/2011 | Gooding | |
| 8,001,352 B1 | 8/2011 | Chatterjee et al. | |
| 8,010,829 B1 | 8/2011 | Chatterjee et al. | |
| 8,037,478 B2 | 10/2011 | Tanaka et al. | |
| 8,041,760 B2 * | 10/2011 | Mamou et al. | 709/200 |
| 8,074,107 B2 | 12/2011 | Sivasubramanian et al. | |
| 8,160,063 B2 | 4/2012 | Maltz et al. | |
| 8,181,061 B2 | 5/2012 | Nightingale et al. | |
| 8,195,950 B2 | 6/2012 | Spearman | |
| 8,234,518 B2 | 7/2012 | Hansen | |
| 8,261,033 B1 | 9/2012 | Slik et al. | |
| 8,266,136 B1 | 9/2012 | Pogde et al. | |
| 8,274,987 B2 | 9/2012 | Jia | |
| 8,296,398 B2 * | 10/2012 | Lacapra et al. | 709/219 |
| 8,296,408 B2 | 10/2012 | Anke et al. | |
| 2001/0042157 A1 | 11/2001 | Pascucci et al. | |
| 2002/0083134 A1 | 6/2002 | Bauer, Jr. et al. | |
| 2002/0093948 A1 | 7/2002 | Dertz et al. | |
| 2002/0152293 A1 | 10/2002 | Hahn et al. | |
| 2002/0194245 A1 | 12/2002 | Simpson et al. | |
| 2003/0014393 A1 | 1/2003 | Kabra et al. | |
| 2003/0131207 A1 | 7/2003 | Arakawa et al. | |
| 2004/0085953 A1 | 5/2004 | Davis | |
| 2004/0153479 A1 | 8/2004 | Mikesell et al. | |
| 2005/0075911 A1 | 4/2005 | Craven, Jr. | |
| 2005/0078655 A1 | 4/2005 | Tiller et al. | |
| 2005/0094640 A1 | 5/2005 | Howe | |
| 2005/0111423 A1 | 5/2005 | Anderson et al. | |
| 2005/0138186 A1 * | 6/2005 | Hesselink et al. | 709/229 |
| 2005/0262097 A1 | 11/2005 | Sim-Tang et al. | |
| 2006/0004759 A1 | 1/2006 | Borthakur et al. | |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0159456 A1 * | 7/2006 | Gumaste et al. | 398/59 |
| 2006/0280168 A1 | 12/2006 | Ozaki | |
| 2006/0288080 A1 | 12/2006 | Orszag et al. | |
| 2007/0025381 A1 | 2/2007 | Feng et al. | |
| 2007/0036093 A1 | 2/2007 | Newberg et al. | |
| 2007/0043824 A1 | 2/2007 | Fremantle | |
| 2007/0094691 A1 | 4/2007 | Gazdzinski | |
| 2007/0147322 A1 | 6/2007 | Agrawal et al. | |
| 2007/0153755 A1 | 7/2007 | Yang et al. | |
| 2007/0156842 A1 | 7/2007 | Vermeulen et al. | |
| 2007/0158432 A1 | 7/2007 | Tadamasa | |
| 2007/0204028 A1 | 8/2007 | Lee | |
| 2007/0230493 A1 | 10/2007 | Dravida et al. | |
| 2007/0248089 A1 | 10/2007 | Redi et al. | |
| 2007/0266208 A1 * | 11/2007 | Kim et al. | 711/154 |
| 2007/0266244 A1 | 11/2007 | Walker et al. | |
| 2007/0286135 A1 | 12/2007 | Kirke | |
| 2008/0005275 A1 | 1/2008 | Overton et al. | |
| 2008/0010400 A1 | 1/2008 | Moon | |
| 2008/0098392 A1 * | 4/2008 | Wipfel et al. | 718/1 |
| 2008/0104442 A1 * | 5/2008 | Diao et al. | 714/3 |
| 2008/0114827 A1 | 5/2008 | Gerber et al. | |
| 2008/0162622 A1 | 7/2008 | Becker et al. | |
| 2008/0215727 A1 * | 9/2008 | Denis et al. | 709/224 |
| 2008/0256138 A1 | 10/2008 | Sim-Tang | |
| 2009/0006888 A1 | 1/2009 | Bernhard et al. | |
| 2009/0097443 A1 | 4/2009 | Pasanen et al. | |
| 2009/0106269 A1 | 4/2009 | Zuckerman et al. | |
| 2009/0109891 A1 | 4/2009 | Fonseca, Jr. et al. | |
| 2009/0112921 A1 | 4/2009 | Oliveira et al. | |
| 2009/0113323 A1 | 4/2009 | Zhao et al. | |
| 2009/0144422 A1 | 6/2009 | Chatley et al. | |
| 2009/0183002 A1 | 7/2009 | Rohrer et al. | |
| 2009/0198958 A1 | 8/2009 | Arimilli et al. | |
| 2009/0201923 A1 | 8/2009 | Menon et al. | |
| 2009/0204405 A1 | 8/2009 | Kato et al. | |
| 2009/0213731 A1 | 8/2009 | Bhasin et al. | |
| 2009/0249418 A1 | 10/2009 | Alastruey Gracia et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0271412 A1 | 10/2009 | Lacapra et al. | |
| 2009/0300407 A1 | 12/2009 | Kamath et al. | |
| 2009/0307329 A1 | 12/2009 | Olston et al. | |
| 2010/0005151 A1 | 1/2010 | Gokhale | |
| 2010/0008230 A1 | 1/2010 | Khandekar et al. | |
| 2010/0008347 A1 | 1/2010 | Qin et al. | |
| 2010/0061366 A1 | 3/2010 | DelRegno et al. | |
| 2010/0094955 A1 | 4/2010 | Zuckerman et al. | |
| 2010/0094956 A1 | 4/2010 | Zuckerman et al. | |
| 2010/0153639 A1 * | 6/2010 | Corry et al. | 711/113 |
| 2010/0161657 A1 | 6/2010 | Cha et al. | |
| 2010/0169287 A1 | 7/2010 | Klose | |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0228835 A1 | 9/2010 | Pitts | |
| 2010/0250648 A1 | 9/2010 | Cao et al. | |
| 2010/0250746 A1 | 9/2010 | Murase | |
| 2010/0277345 A1 | 11/2010 | Rodriguez et al. | |
| 2010/0332454 A1 | 12/2010 | Prahlad et al. | |
| 2010/0332818 A1 | 12/2010 | Prahlad et al. | |
| 2011/0022574 A1 | 1/2011 | Hansen | |
| 2011/0075628 A1 | 3/2011 | Cho et al. | |
| 2011/0083154 A1 | 4/2011 | Boersma | |
| 2011/0099126 A1 | 4/2011 | Belani et al. | |
| 2011/0145442 A1 | 6/2011 | Diab | |
| 2011/0153835 A1 | 6/2011 | Rimac et al. | |
| 2011/0161723 A1 | 6/2011 | Taleck et al. | |
| 2011/0205974 A1 | 8/2011 | Zhu et al. | |

(56) References Cited

U.S. PATENT DOCUMENTS

| | | |
|---|---|---|
| 2011/0208837 A1 | 8/2011 | Sartori |
| 2011/0219208 A1 | 9/2011 | Asaad et al. |
| 2011/0228789 A1 | 9/2011 | Jia |
| 2011/0246471 A1 | 10/2011 | Rakib |
| 2011/0246735 A1 | 10/2011 | Bryant et al. |
| 2011/0258290 A1 | 10/2011 | Nightingale et al. |
| 2011/0258297 A1 | 10/2011 | Nightingale et al. |
| 2011/0258482 A1 | 10/2011 | Nightingale et al. |
| 2011/0258488 A1 | 10/2011 | Nightingale et al. |
| 2011/0283019 A1 | 11/2011 | Bennett et al. |
| 2011/0292949 A1 | 12/2011 | Hayashi et al. |
| 2011/0296025 A1 | 12/2011 | Lieblich et al. |
| 2011/0307886 A1 | 12/2011 | Thanga et al. |
| 2012/0041976 A1 | 2/2012 | Annapragada |
| 2012/0042162 A1 | 2/2012 | Anglin et al. |
| 2012/0047239 A1 | 2/2012 | Donahue et al. |
| 2012/0054556 A1 | 3/2012 | Grube et al. |
| 2012/0158948 A1 | 6/2012 | Pang et al. |
| 2012/0197958 A1 | 8/2012 | Nightingale et al. |
| 2012/0207036 A1 | 8/2012 | Ong et al. |
| 2012/0224481 A1 | 9/2012 | Babiarz et al. |
| 2012/0256735 A1 | 10/2012 | Gilson |
| 2012/0278400 A1 | 11/2012 | Elson et al. |
| 2015/0052392 A1 | 2/2015 | Mickens et al. |

FOREIGN PATENT DOCUMENTS

| | | |
|---|---|---|
| WO | WO03038628 A1 | 5/2003 |
| WO | WO2010108368 A1 | 9/2010 |

OTHER PUBLICATIONS

U.S. Appl. No. 13/598,990, "Block Level Access to Parallel Storage", Fan et al, filed Aug. 30, 2012.
Baratto et al., "THINC: A Remote Display Architecture for Thin-Client Computing", In Technical Report CUCS-027-04, Jul. 2004, 15 pages.
Bonwick et al., "ZFS: The Last Word in File Systems", retrieved at <<wiki.illumos.org/download/attachments/1146951zfs_last.pdf>>, Sun microsystems, Sep. 2008, 44 pages.
Borthakur, "The Hadoop Distributed File System: Architecture and Design", retrieved at <<http://hadoop.apache.org/docs/stable/hdfs_design.html>>, The Apache Software Foundation, Mar. 2013, 8 pages.
Braam, "The Lustre Storage Architecture", Cluster File Systems, Inc., Aug. 2004, 439 pages.
Carnes rt al., "PVFS: A Parallel File System for Linux Clusters", In Proceedings of the Extreme Linux Track: 4th Annual Linux Showcase and Conference, Oct. 2000, 11 pages.
"Citrix Xen-Desktop Virtualization Desktop Infrastructure", retrieved on Jun. 11, 2013 at <<http://www.citrix.com/solutions/desktop-virtualization/overview.html>> Citrix Systems, Inc., Available as early as 1999, 2 pages.
Norton et al., "Common Internet File System (CIFS) Technical Reference", Storage Networking Industry Association, Mar. 2002, 150 pages.
Feller, Virtual Desktop Resource Allocation, retrieved at <<http://blogs.citrix.com/2010/11/12/virtual-desktop-resource-allocation>>, Citrix Systems, Inc., Nov. 2010, 2 pages.
Fellows, "Storage Optimization for VDI", Storage Networking Industry Association, Oct. 2011, 42 pages.
Ghemawat et al., "The Google File System", In Proceedings of the Nineteenth ACM Symposium on Operating Systems Principles, Oct. 2003, 15 pages.
Greenberg et al., "Towards a Next Generation Data Center Architecture: Scalability and Commoditization", In Proceedings of the ACM Workshop on Programmable Routers for Extensible Service of Tomorrow, Aug. 2008, pp. 57-62.
Hartman et al., "The Zebra Striped Network File System" In Proceedings of the Fourteenth ACM Symposium on Operating Systems Principles, Dec. 1993, pp. 29-43.
Hitz et al., "File System Design for an NFS File Server Appliance" USENIX Winter 1994 Conference, Jan. 1994, 23 pages.
Hopkins et al., "AoE (ATA over Ethernet)", The Brantley Coile Company, Inc., Feb. 2009, 14 pages.
TechNet, "How Dynamic Disks and Volumes Work", available at <<http://technet.microsoft.com/en-us/library/cc758035>>, Microsoft, last updated Mar. 2003, 19 pages.
Howard et al., "Scale and Performance in a Distributed File System", Journal of ACM Transactions on Computer Systems, vol. 6, Issue 1, Feb. 1988, pp. 51-81.
Hsiao et al., "Chained Declustering: A New Availability Strategy for Multiprocessor Database Machines", Sixth Annual Conference on Data Engineering, Feb. 1990, 10 pages.
TechNet, "Jetstress Field Guide", retrieved at <<http://gallery.technet.microsoft.com/Jetstress-Field-Guide-1602d64c>>, Microsoft, Inc., Nov. 2010, 1 page.
Kistler et al., "Disconnected Operation in the Coda File System", ACM Transactions on Computer Systems, vol. 10, No. 1, Feb. 1992, pp. 3-25.
Krioukov et al., "Parity Lost and Parity Regained", The Proceedings of the 6th USENIX Conference on File and Storage Technologies, Feb. 2008, pp. 127-141.
Lee et al., "Petal: Distributed Virtual Disks", In the Proceedings of the 7th International Conference on Architectural Support for Porgramming Languages and Operating Systems, vol. 31, No. 9, Sep. 1996, 9 pages.
Lim et al., "Voluntary Disconnected Operations for Energy Efficient Mobile Devices in Pervasive Computing Environments", In Intelligent Automation & Soft Computing, vol. 19, Issue 1, Mar. 2013, pp. 1-12.
Menon et al., "IBM Storage Tank—A heterogeneous scalable SAN file system", IBM Systems Journal, vol. 42, No. 2, Nov. 2003, pp. 250-267.
Nightingale et al., "Flat Datacenter Storage", 10th USENIX Symposium on Operating Systems Design and Implementation, Oct. 18, 2012, 15 pages.
Nightingale et al., "Rethink the Sync", 7th USENIX Symposium on Operating Systems Design and Implementation, Nov. 2006, 14 pages.
Office action for U.S. Appl. No. 13/112,978, mailed on Jan. 16, 2014, Elson, et al., "Data Layout for Recovery and Durability", 18 pages.
Office action for U.S. Appl. No. 13/096,194, mailed on Sep. 23, 2013, Elson, et al., "Effective Circuits in Packet-Switched Networks", 26 pages.
Office action for U.S. Appl. No. 13/017,193, mailed on Dec. 5, 2013, Nightingale, et al., "Parallel Serialization of Request Processing", 19 pages.
Pawlowski et al., "NFS Version 3 Design and Implementation", Summer USENIX Conference, Jun. 1994, 15 pages.
Rodeh et al., "zFS—A Scalable Distributed File System Using Object Disks", 20th IEEE/11th NASA Goddard Conference on Mass Storage Systems and Technologies, Apr. 2003, 12 pages.
Satran et al., "Internet Small Computer Systems Interface (iSCSI)", Technical Report, RFC3720, IBM, Apr. 2004, 155 pages.
Schmuck et al., "GPFS: A Shared-Disk File System for Large Computing Clusters", In Proceedings of the Conference on File and Storage Technologies (FAST'02), Jan. 2002, pp. 231-244.
Shepler et al., "Network File System (NFS) Version 4 Minor Version 1 Protocol", Technical Report, RFC 5661, Internet Engineering Task Force, Jan. 2010, 618 pages.
Terry et al, "Managing Update Conflicts in Bayou, a Weakly Connected Replicated Storage System", in Proceedings of the 15th ACM Symposoim on Operating System Principles, Dec. 1995, pp. 172-183.
Verbowski et al., "Flight Data Recorder: Monitoring Persistent-State Interactions to Improve Systems Management", in Proceedings of the 7th USENIX Symposium on Operating Systems Design and Implementation, Nov. 2006, pp. 117-130.
"VMware View—Your Cloud, Your Desktop, Just Got Better", retrieved Jun. 2013 at <<www.vmware.com/files/pdf/view/VMware-View-Datasheet.pdf>>, VMware, Inc., Jan. 2011, 4 pages.

(56) References Cited

OTHER PUBLICATIONS

Vrable et al., "BlueSky: A Cloud-Backed File System for the Enterprise", Proceedings of the 10th USENIX Conference on File and Storage, Feb. 2013, 14 pages.
Vrable et al., "Cumulus: Filesystem Backup to the Cloud", In 7th USENIX Conference on File Storage Technologies, Feb. 2009, pp. 1-14.
Vrable, "Migrating Enterprise Storage Applications to the Cloud", In Doctoral Dissertation, University of California, Apr. 2011, pp. 1-112.
Weil et al., "Ceph: A Scalable, High-Performance Distributed File System" in Proceedings of the 7th USENIX Symposium on Operating Systems Design and Implementation, Nov. 2006, pp. 307-320.
Weinsberg et al., "A Programming Model and System Support for Disconnected-Aware Applications on Resource-Constrained Devices", in Proceedings of the 24th International Conference on Software Engineering, May 2002, pp. 374-384.
Welch et al., "Scalable Performance of the Panasas Parallel File System" in Proceedings of the 8th USENIX Conference on File and Storage Technologies, Feb. 2008, pp. 17-33.
TechNet, "Windows PE Technical Reference", available at <<http://technet.microsoft.com/en-us/library/dd744322>>, Microsoft, Oct. 2009, 2 pages.
Office Action for U.S. Appl. No. 12/763,107, mailed on Jul. 20, 2012, Nightingale et al., "Locator Table and Client Library for Datacenters", 11 pages.
Non-Final Office Action for U.S. Appl. No. 12/763,133, mailed on Sep. 16, 2011, Edmund Nightingale, "Memory Management and Recovery for Datacenters", 18 pages.
Office action for U.S. Appl. No. 13/017,193, mailed on Jun. 3, 2013, Nightingale et al., "Parallel Serialization of Request Processing", 21 pages.
Non-Final Office Action for U.S. Appl. No. 13/112,978, mailed on Jul. 17, 2013, Elson et al., "Data Layout for Recovery and Durability", 15 pages.
U.S. Appl. No. 12/410,697, "Data Center Without Structural Bottlenecks," Maltz et al, filed Mar. 25, 2009.
U.S. Appl. No. 12/410,745, "Data Center Interconnect and Traffic Engineering," Maltz et al, filed Mar. 25, 2009.
U.S. Appl. No. 12/578,608, "Agile Data Center Network Architecture," Greenberg et al, filed Oct. 14, 2009.
Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.
Bafna et al, "CHIRAYU: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.
Buddhikot et al, "Design of a Large Scale Multimedia Storage Server," Journal Computer Networks and ISDN Systems, vol. 27, Issue 3, Dec. 1994, pp. 1-18.
Chen et al, "Replication-Based Highly Available Metadata Management for Cluster File Systems," 2010 IEEE International Conference on Cluster Computing, Sep. 2010, pp. 292-301.
"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.
"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.
Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.
Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.
Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.
Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.
Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.
Sinnamohideen et al, "A Transparently-Scalable Metadata Service for the Ursa Minor Storage System," USENIX ATC'10 Proceedings of the 2010 USENIX Conference, Jun. 2010, 14 pgs.
Weil et al, "CRUSH: Controlled, Scalable, Decentralized Placement of Replicated Data," Proceedings of SC '06, Nov. 2006, 12 pgs.
Weiser, "Some Computer Science Issues in Ubiquitous Computing," retrieved at <<https://www.cs.ucsb.edu/~ravenben/papers/coreos/Wei93.pdf>>, Mar. 1993, 14 pgs.
Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.
Kennedy, "Is Parallel Computing Dead", retrieved on Oct. 2, 2012, at http://www.crpc.rice.edu/newsletters/oct94/director.html., Parallel Computing Newsletter, vol. 2, Issue 4, Oct. 1994, 2 pages.
Office Action for U.S. Appl. No. 13/412,944, mailed on Oct. 11, 2012, Nightingale et al., "Reading and Writing During Cluster Growth Phase", 9 pages.
Office Action for U.S. Appl. No. 13/112,978, mailed on Dec. 14, 2012, Elson et al., "Data Layout for Recovery and Durability", 13 pages.
Office Action for U.S. Appl. No. 13/017,193, mailed on Dec. 3, 2012, Nightingale et al., "Parallel Serialization of Request Processing", 19 pages.
PCT Search Report and Written Opinion mailed Oct. 23, 2012 for PCT Application No. PCT/US2012/035700, 10 pages.
European Office Action mailed Oct. 6, 2014 for European patent application No. 12776594.9, a counterpart foreign application of U.S. Appl. No. 13/096,194, 6 pages.
Office action for U.S. Appl. No. 13/096,194, mailed on Nov. 6, 2014, Elson et al., "Effective Circuits in Packet Switched Networks", 25 pages.
Corbett et.al. "The Vesta Parallel File System" ACM Transactions on Computer Systems, vol. 14, No. 3, Aug. 1996, 40 pgs.
He et al, "Performance Evaluation of Distributed iSCSI Raid", Proc of Intl Workshop on Storage Network Architecture and Parallel I/Os, Sep. 2003, 8 pgs.
International Search Report for PCT Application No. PCT/US2013/056070, mailed Date Nov. 20, 2013; Filed Date Aug. 22, 2013, 11 pgs.
"Introduction to the Azure Platform", Microsoft Patterns & Practices, retrieved at <<http:f/msdn.microsoft.com/en-us/libraryfff803364.aspx>>, Dec. 6, 2011, pp. 1-13.
Lesem, Steve, "Cloud Storage Strategy", Cloud Taxonomy Archives, retrieved at <<http:f/cloudstoragestrategy.com/cloud-taxonomy/>>, Jan. 24, 2012, pp. 1-21.
Office action for U.S. Appl. No. 13/112,978, mailed on Dec. 3, 2014, Elson, et al., "Data Layout for Recovery and Durability", 14 pages.
Ousterhout, et al., "The Case for RAMClouds: Scalable High-Performance Storage Entirely in DRAM", SIGOPS Operating Systems Review, vol. 43, D No. 4, Dec. 2009, pp. 92-105.
European Office Action mailed Apr. 1, 2015 for European patent application No. 12776594.9, a counterpart foreign application of U.S. Appl. No. 13/096,194, 6 pages.
Office action for U.S. Appl. No. 13/112,978, mailed on Apr. 3, 2015, Elson et al., "Data Layout for Recovery and Durability", 16 pages.
Office Action for U.S. Appl. No. 13/598,990, mailed on Apr. 9, 2015, Fan et al., "Block-level Access to Parallel Storage", 18 pages.

(56) References Cited

OTHER PUBLICATIONS

Office Action for U.S. Appl. No. 13/598,990, mailed on Sep. 11, 2014, Fan et al., "Block-level Access to Parallel Storage", 8 pages.
European Office Action mailed May 23, 2014 for European patent application No. 12776594.9, a counterpart foreign application of U.S. Appl. No. 13/096,194, 6 pages.
Supplementary European Search Report mailed May 13, 2014 for European Patent Application No. 12776594.9, 4 pages.
Office action for U.S. Appl. No. 13/112,978 mailed on May 22, 2014, Elson et al., "Data Layout for Recovery and Durability", 11 pages.
Office Action for U.S. Appl. No. 13/017,193, mailed on Jul. 18, 2014, Edmund B. Nightingale, "Parallel Serialization of Request Processing", 21 pages.
Office action for U.S. Appl. No. 13/096,194, mailed on Feb. 7, 2014, Elson, et al., "Effective Circuits in Packet-Switched Networks", 23 pages.
Translated copy of the Chinese Office Action mailed Jun. 3, 2015 for Chinese patent application No. 201280020755.7, a counterpart foreign application of U.S. Appl. No. 13/096,194, 15 pages.
Qin, et al., "Test and Simulation System of the Ad Hoc Network Based on Height Speed Ethernet", Computer Applications, Roll 26, Issue 6, pp. 1298-1300.

* cited by examiner

SERVER FAILURE RECOVERY

RELATED APPLICATIONS

This U.S. patent application is a continuation-in-part patent application of co-pending prior application Ser. No. 12/763,107, entitled "Locator Table and Client Library for Datacenters," and of co-pending prior application Ser. No. 12/763,133, entitled "Memory Management and Recovery for Datacenters." Both co-pending prior applications were filed on Apr. 19, 2010. This U.S. patent application is also a continuation-in-part patent application of co-pending prior Application Ser. No. 13/017,193, entitled "Parallel Serialization of Request Processing" and filed on Jan. 31, 2011. U.S. application Ser. Nos. 12/763,107, 12/763,133, and 13/017,193 are hereby incorporated by reference in their entirety herein.

BACKGROUND

Distributed data storage systems, such as those used in cloud computing environments, often rely on a metadata server to identify which servers store what data. This metadata server typically maintains a metadata table or namespace mapping identifiers associated with data to the servers that store the data. Because the file system must be durable even across reboots of the metadata server, the metadata server typically stores the metadata table or namespace in permanent (durable) storage. While the use of permanent storage may ensure that system metadata is not lost to metadata server failures, permanent storage is typically quite slow. Thus, the use of permanent storage may cause poor performance when the metadata server needs to update or distribute the metadata table.

Also, the metadata server typically manages changes to the metadata table or namespace responsive to failures of other data servers of the system. The metadata server may select a replacement server for a failed server and update the metadata table or namespace to reflect the replacement. The metadata server may also manage a recovery process during which data from a replica of the failed server is written to the replacement server. During this recovery process, the metadata server may delay responding to client requests for an updated metadata table or namespace to ensure that the recovery process is complete prior to client interactions with the servers. This delay, however, comes at the cost of system performance, as clients must wait until the recovery process completes to renew their operations.

SUMMARY

A metadata server described herein is configured to store storage assignment mappings in non-persistent storage and distribute storage assignments from the storage assignment mappings to servers of the system associated with those storage assignments. The servers store the storage assignments in persistent storage. In response to a metadata server failure, the metadata server receives the storage assignments from the servers and rebuilds the storage assignment mappings from the storage assignments. The metadata server also manages the recovery process for a server failure, selecting one or more replacement servers and updating the storage assignment mappings to reflect the replacements. After updating the storage assignment mappings but before completion of the recovery process, the metadata server provides the storage assignment mappings to clients to enable the clients to continue to operate during the recovery process.

The replacement servers described herein are configured to process client requests during the recovery process, storing data associated with client write requests. Version information for that data is then compared to version information for data received from other servers as part of the recovery process. The replacement servers then conditionally overwrite the stored data with the data received from the other servers if the stored data and data received from the other servers are associated with a same identifier and if the comparison of version information indicates that the data received from the other servers is associated with a newer version of the storage assignment mappings than the stored data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
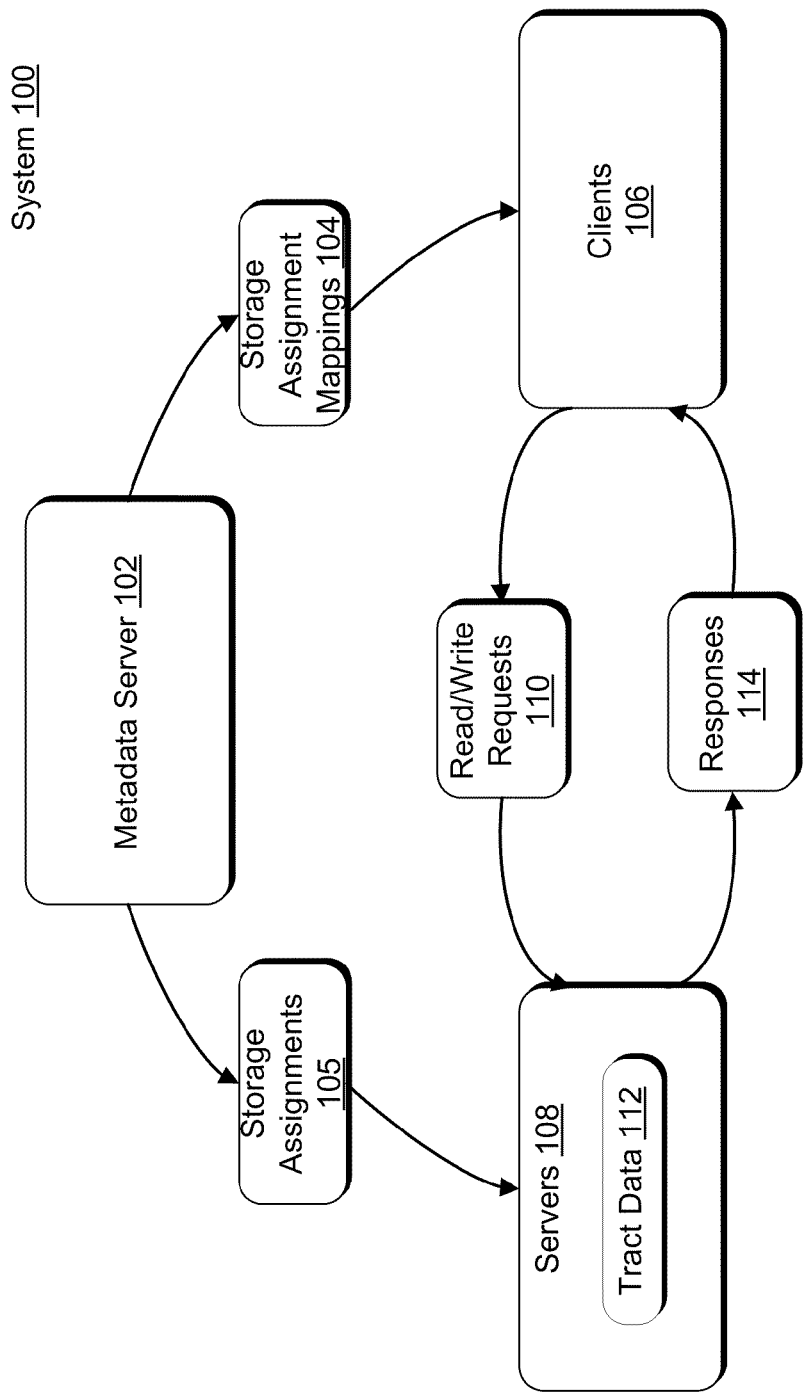
FIG. 1 illustrates an example environment in which storage assignment mappings are provided by a metadata server of a system to clients and servers of the system to enable client and server operations, in accordance with various embodiments.

Described herein are techniques for recovering from failures of a metadata server of a system and failures of other servers of the system. The techniques also include enabling clients of the system to operate during the recovery process associated with a server failure.

In various embodiments, the metadata server recovers from a metadata server failure by rebuilding storage assignment mappings. Because the storage assignment mappings are stored in non-persistent storage of the metadata server, they are lost when metadata server failures or power cycles occur. Non-persistent storage is used over persistent storage, however, to enable more efficient updates and transmissions of the storage assignment mappings. The storage assignment mappings comprise system metadata, including storage assignments associated with one of rows or columns and server replicas associated with the other of the rows or columns. Each storage assignment is associated with a plurality of server replicas and is representative of one or more data items stored by that plurality of server replicas. The storage assignment mappings, then, allows clients and other devices using the storage assignment mappings to determine which server replicas store which data items.

At a system initialization stage, the metadata server provides the storage assignments to the servers of the system, each server storing in persistent storage the storage assignments associated with that server in the storage assignment mappings. Because the number and size of the storage assignments for each server is much smaller than the entire storage assignment mappings, and because the storage assignments are updated infrequently, storing the storage assignments in persistent storage of the servers has a smaller impact on overall system performance. The metadata server also stores the storage assignment mappings in non-persistent storage during the system initialization stage. When a metadata server failure or power cycle subsequently occurs, the metadata server recovers the storage assignment mappings by receiving the storage assignments stored at each server from those servers and rebuilding the storage assignment mappings from the storage assignments.

In some embodiments, the metadata server includes a primary metadata server and some number of backup metadata servers, including at least a secondary metadata server. The primary metadata server performs the operations described herein of the metadata server, and the secondary metadata server waits until the primary metadata server fails. Upon failure of the primary metadata server, the secondary metadata server assumes the role of the primary metadata server and builds the storage assignment mappings from the storage assignments stored by the other servers. Upon recovery, the former primary metadata server assumes the role of secondary metadata server.

In a number of embodiments, client requests for storage assignment mappings received during a recovery process from a metadata server failure are answered upon completion of the recovery process. In embodiments in which the metadata server includes a primary metadata server and a backup metadata server, the clients request the storage assignment mappings from the secondary metadata server when the clients fail to receive responses to requests made to the primary metadata server.

In various embodiments, the metadata server also manages the recovery process associated with a server failure. The metadata server periodically receives heartbeat messages from the servers. When one or more heartbeat messages are not received from a server, such as a threshold number of heartbeat messages, the metadata server determines that the server has failed and initiates a recovery process. During that process, the metadata server generates a recovery plan proposing one or more replacement servers for the failed server. The metadata server provides that recovery plan to the servers and, upon receiving acknowledgements from the servers, updates the storage assignment mappings to reflect the replacement servers. The metadata server then manages the writing of data from a number of the servers to the replacement servers. Upon completion of the writing, the recovery process is deemed complete.

The metadata server further enables clients of the system to operate during the recovery process associated with the failed server. The metadata server may receive requests from clients for the storage assignment mappings during the recovery process and provide the storage assignment mappings to the clients. The metadata server may provide the storage assignment mappings after the storage assignment mappings are updated with the replacement server(s) but before the recovery process is complete. The clients then make read or write requests of a replacement server and/or its replica servers. Because the clients may provide a replacement server with new data associated with a specific identifier before the replacement server has received older data associated with the identifier as part of the recovery process, race conditions may exist. In these race conditions, there is the risk of older data overwriting newer data and inconsistent state existing in the system. For example, if the replacement server overwrites the newer data from the client with the older data received during the recovery process, that replacement server will have the older data. Its replica servers, however, may also receive the newer data from the client and store that newer data, creating inconsistency between replicas. To avoid this inconsistency, data is stored in association with version information. This version information corresponds to a version of the storage assignment mappings used by a client at the time that the client writes the data. The replacement server utilizes the version information stored with the newer data and version information received with the older data to determine that the newer data is associated with a newer version of the storage assignment mappings. Because it is associated with a newer version, the newer data is not overwritten.

As mentioned, each storage assignment of the storage assignment mappings is representative of one or more data items. These data items may be of any type, size, or grouping. In some embodiments, data items may be stored as units of data called "tracts." Tracts have a predetermined same or similar size, such as one megabyte, and represent the smallest unit of data that can be read from or written to a storage unit that maximizes performance. For example, on a mechanical device, such as a disk, the tract size would be large enough to avoid to giving up performance due to the lost opportunity of reading more data "for free" after a seek or rotational delay. As a second example, on a medium such as flash, the tract size would be calculated based on the chip bandwidth and characteristics of the flash storage medium. Each tract belongs to a byte sequence, each byte sequence being comprised of multiple tracts distributed across multiple servers of the system to enable more efficient reading from and writing to the tracts. In such embodiments, the storage assignment mappings may be tract storage assignment mappings, such as "tract locator tables" that may be used by clients for reading from and writing to tracts, as well as for identifying servers storing metadata for byte sequences. Also, in such embodiments, the storage assignment may be a prefix taken from a fixed length translation, such as a hash, of a tract identifier. Alternatively, the storage assignment may be the remainder of a mod operation that divides one of the prefix, the hash, or the tract identifier for a tract by the number of storage assignments used in the tract locator table.

Tracts, byte sequences, tract locator tables, and their uses are described in greater detail in U.S. patent application Ser. No. 12/763,107, entitled "Locator Table and Client Library for Datacenters" and filed on Apr. 19, 2010, U.S. patent application Ser. No. 12/763,133, entitled "Memory Management and Recovery for Datacenters" and filed on Apr. 19, 2010, and U.S. patent application Ser. No. 13/017,193, entitled "Parallel Serialization of Request Processing" and filed on Jan. 31, 2011. These applications are incorporated herein by reference above in "Related Applications."

While FIGS. 1-3 below illustrate an example environment in which the storage assignment mappings are a tract locator table and the data items are tracts, it is to be understood that the techniques described herein are in no way limited to tracts and tract locator tables.

Example Environment

FIG. 1 illustrates an example environment in which storage assignment mappings are provided by a metadata server of a system to clients and servers of the system to enable client and server operations, in accordance with various embodiments. As illustrated, a system 100 includes a metadata server 102 configured to provide a storage assignment mappings 104 to clients 106 of the system 100 and storage assignments 105 to servers 108 of the system 100. The clients 106 make read and write requests 110 of the servers 108 related to tract data 112 that the servers 108 are storing or designated to store. The servers 108 respond 114 with requested tract data 112 or with an acknowledgement that tract data 112 has been successfully written to the servers 108.

Figure 7:
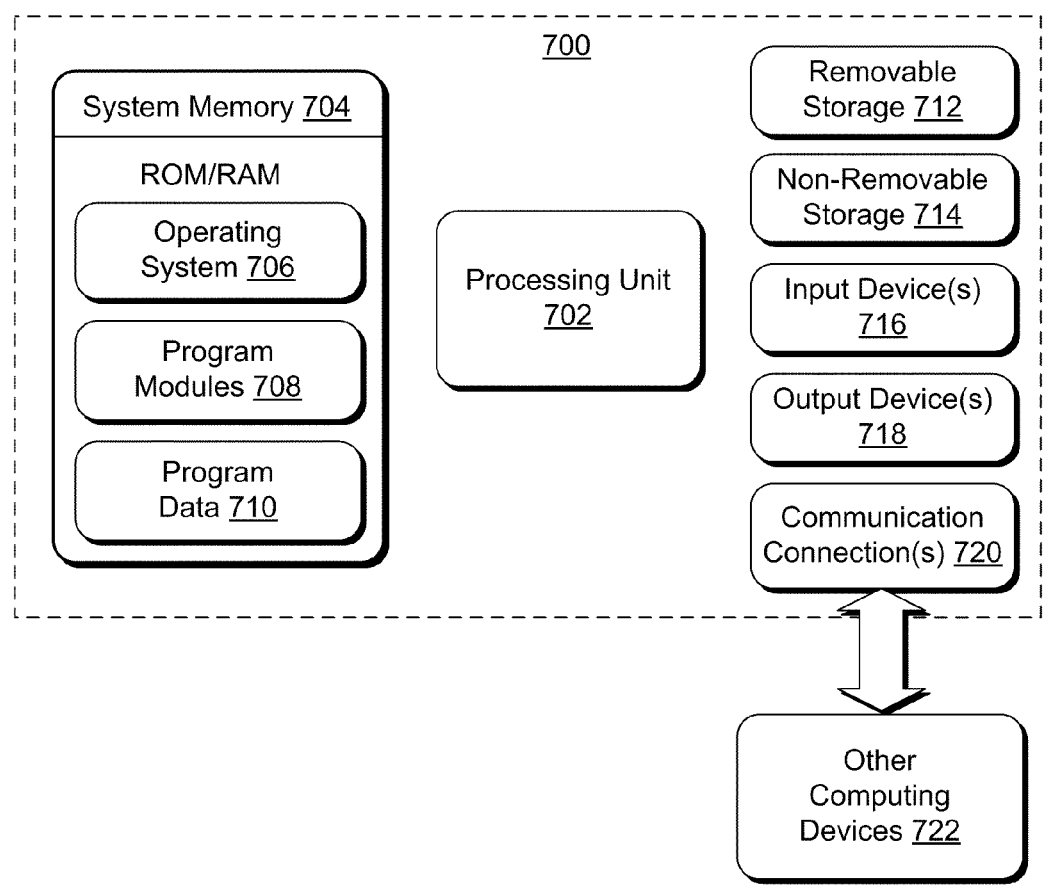
FIG. 7 illustrates a block diagram showing an example system architecture for a computer system such as a metadata server, a client, or a server, in accordance with various embodiments.

In various embodiments, the metadata server 102, clients 106, and servers 108 may each be any sort of computing device or computing devices. For example, the metadata server 102, clients 106, and servers 108 may each be or include a personal computer (PC), a laptop computer, a server or server farm, a mainframe, a work station, or any other sort of device or devices. In one implementation, the metadata server 102, clients 106, and servers 108 represent a plurality of computing devices working in communication, such as a cloud computing network of nodes. When implemented on multiple computing devices, the metadata server 102, a client 106, or a server 108 may distribute the modules and data of the metadata server 102, the client 106, or the server 108 among the multiple computing devices. In some implementations, the metadata server 102, a client 106, or a server 108 represents one or more virtual machines implemented on one or more computing devices. The nature and functions of the modules and data of the metadata server 102, clients 106, and servers 108 are described further herein. An example metadata server 102, client 106, or server 108 is illustrated in FIG. 7 and is described below in greater detail with reference to that figure.

In some embodiments, each server 108 may be associated with a storage node of a computing device. In such embodiments, a computing device may include multiple servers 108, one for each storage node.

In further embodiments, servers 108 may be virtual servers. In such embodiments, virtual servers may be logical representations of servers 108, with multiple virtual servers assigned to a single actual server 108 by a table or other data structure storing virtual server-server 108 mappings. Alternatively, virtual servers may correspond to virtual machine implementations of servers 108.

In some embodiments, a network or networks may connect the metadata server 102, clients 106, and servers 108. The network or networks may be any type of networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Internet Protocol (IP), other packet based protocols, or other protocols. Additionally, the network or networks may comprise any number of intermediary devices, such as routers, base stations, access points, firewalls, or gateway devices.

In various embodiments, the storage assignment mappings 104 may be any sort of data structure or data structures of any program or programs. For example, the storage assignment mappings 104 may be a metadata table that includes rows corresponding to storage assignments and columns corresponding to server replicas 108. Each storage assignment may be an index to the metadata table and correspond to one or more data items. The server replicas 108 associated with that storage assignment are the server replicas 108 storing or designated to store the one or more data items. Each intersection of a row and column, then, represents a server replica 108 that stores one or more data items corresponding to a storage assignment. In other embodiments, the rows and columns may be reversed, with columns corresponding to storage assignments and rows to server replicas 108. In yet other embodiments, the storage assignment mappings 104 may be a namespace rather than a metadata table.

As mentioned above, the storage assignment mappings 104 are generated by the metadata server 102. In some embodiments, the metadata server 102 generates the storage assignment mappings 104 based on rules and parameters. These rules and parameters are used to determine a number of storage assignments to include in the storage assignment mappings 104, to specify the possible storage assignments, to determine the number of server replicas 108 per storage assignment, and to assign server replicas 108 to storage assignments.

In some embodiments, the metadata server 102 generates the storage assignment mappings 104 during a system initialization phase. During the system initialization phase, all of the devices involved in the system 100 are brought online without any failures. Using parameters describing the system 100 that may be received from an operator or another device, the metadata server 102 builds the storage assignment mappings 104. The metadata server 102 then either transmits the storage assignments 105 associated with each server 108 in the storage assignment mappings 104 to that server 108 or transmits the entire set of storage assignment mappings 104 to the servers 108 of the system 100. This enables the servers 108 to persistently store the storage assignments 105 associated with those servers 108 in the storage assignment mappings 104. The metadata server 102 also stores the storage assignment mappings 104 in non-persistent storage of the metadata server 102 and transmits the storage assignment mappings 104 to clients 106 to enable operations of those clients 106. In some embodiments, rather than transmitting the storage assignment mappings 104 or storage assignments 105, the metadata server 102 transmits one or both of rules or parameters to the clients 106 and servers 108 to enable those clients 106 and servers 108 to build the storage assignment mappings 104 or storage assignments 105 themselves.

As described above, the metadata server 102 loses the storage assignment mappings 104 that are stored in non-persistent storage when the metadata server 102 fails or power cycles. Responsive to a failure or power cycle, the metadata server 102 rebuilds the storage assignment mappings 104 from storage assignments 105 stored in persistent storage of the servers 108. In embodiments in which the metadata server 102 comprises primary and secondary metadata servers, those primary and secondary metadata servers switch roles during and after recovery. The metadata server 102 also waits to respond to client requests for a storage assignment mappings 104 received during a failure or power cycle until recovery is complete. An example failure/power cycle scenario is illustrated in FIG. 2 and described in further detail below.

The metadata server 102 also manages the recovery process associated with the failure of a server 108. In response to determining that a server 108 has failed, the metadata server 102 selects one or more replacement servers 108, such as a replacement server 108 for each storage assignment associated with the failed server 108, and updates the storage assignment mappings 104. The metadata server 102 then manages the writing of data from groups of servers 108 to the replacement servers 108, each replacement server 108 associated with a group of servers 108 by a storage assignment from the storage assignment mappings 104. When the writing is complete, the metadata server 102 determines that the recovery process for the server failure is complete. In some embodiments, the metadata server 102 responds to client requests for a storage assignment mappings 104 during the recovery, providing the storage assignment mappings 104 to the clients 106 after the storage assignment mappings 104 is updated but before the recovery process is complete. This enables clients 106 to perform read and write operations 110 while recovery is ongoing. An example server failure scenario is illustrated in FIG. 3 and described in further detail below.

The clients 106 and servers 108 may store the storage assignment mappings 104 or storage assignments 105 upon reception. In various embodiments, the client 106 may have a client library or other component to perform operations relating to data items and sets of data items, such as the above described tracts and byte sequences. The client 106 determines or receives identifiers of byte sequences or tracts and uses those identifiers to generate one or more storage assignments. Upon generating the storage assignment or storage assignments, the client 106 looks up the server replicas 108 associated with that storage assignment or those storage assignments in the storage assignment mappings 104.

In some embodiments, the client 106 may have received a request from an application to create, delete, or write to a byte sequence. Using an identifier associated with the byte sequence, the client 106 determines server replicas 108 storing byte sequence metadata. The client 106 then transmits requests 110 to the identified server replicas 108. The requests 110 may seek the creation or deletion of a byte sequence or the allocation of one or more tracts of a byte sequence for the client 106 to write to. The servers 108 may provide responses 114 indicating the success or failure of these requests 110 and, if tracts are allocated, provide identifiers of those tracts. Provided tract identifiers may then be used by the client 106 to identify server replicas 108 designated to store tract data for those tracts.

The client 106 may also or instead receive a request from an application to read from or write to a byte sequence or specific tracts of a byte sequence. Using identifiers associated with the tracts, the client 106 determines the server replicas 108 storing the tract data 112 for those tracts. If the write request is for writing to a new tract, the client 106 first issues a request 110, as described above, to receive a tract allocation. Once server replicas 108 storing or designated to store all tracts to be read from or written to are identified, the client 106 makes read or write requests 110 to the server replicas 108. Read requests 110 may initially be made of a single server replica 108, with use of the others only being made when a response 114 is not returned or when the response indicates that the server replica 108 is a replacement server 108 that has not yet received the requested tract from the other server replicas 108. Write requests 110 may be made in parallel of the identified server replicas 108 or may be made to one or a subset of the server replicas 108, which then relay the write request 110 to the other server replicas 108. The response 114 to a read request 110 returns the requested tract data 112 if the request is successful. The response 114 to a write request 110 indicates success or failure of the request 110.

In various embodiments, the server 108 receiving the write request 110 may be a replica server 108 performing the recovery process. In such embodiments, the server 108 may receive a write request 110 from a client 106 and store the data included in the write request 110 as tract data 112. The server 108 may then receive tract data 112 associated with the same tract written by the client 106 from the group of servers 108 providing the tract data 112 as part of the recovery process. To determine which version of tract data 112 is more recent, the server 108 compares version information included in the tract data 112. The version information specifies the version of the storage assignment mappings 104 used by a client 106 in writing the tract data 112. If the comparison indicates that the tract data 112 stored from the client request 110 is associated with a same tract as the tract data 112 received during recovery from the group of servers 108 and that the stored tract data 112 was written using an older version of the storage assignment mappings 104 than the recovery tract data 112, then the server 108 overwrites the stored tract data 112 with the recovery tract data 112. If the recovery tract data 112 was written using an older version of the storage assignment mappings 104, then it is discarded or stored in addition to the stored tract data 112.

In some embodiments, a server 108 may indicate in its response 114 that the storage assignment mappings 104 being used by a client 106 are out-of-date. The server 108 may determine this by comparing the current version of the storage assignment mappings 104 to version information included in the request 110 which indicates the version of the storage assignment mappings 104 being used by the client 106. Based on such a response 114, the client 106 requests updated storage assignment mappings 104 from the metadata server 102. The client 106 may also request updated storage assignment mappings 104 based on the failure of a server 108 to respond in a given time period.

In various embodiments, servers 108 utilize the storage assignments 105 to determine which storage assignments they are associated with. The servers 108 then store these storage assignments 105 in persistent storage of the servers 108. As mentioned above, these storage assignments 105 are provided to the metadata servers 102 responsive to a failure or power cycle of the metadata server 102. The servers 108 also use the storage assignments 105 to validate requests 110, ensuring that it is the appropriate server 108 for the requests 110 and providing a negative response if it is not the appropriate server 108. In some embodiments, when the server 108 has been provided with the storage assignment mappings 104, the server 108 further utilizes the storage assignment mappings 104 to determine which servers 108 are replicas for given storage assignments that the server 108 is associated with in order to transmit write requests 110 received from the clients 106 to the other server replicas 108.

In some embodiments, a server 108 stores tract data 112 from a plurality of byte sequences, the tracts of a given byte sequence being distributed among a plurality of the servers 108. In other embodiments, tract data 112 comprises other types of data of differing sizes.

Example Metadata Server Failure and Power Cycle Scenarios

Figure 2:
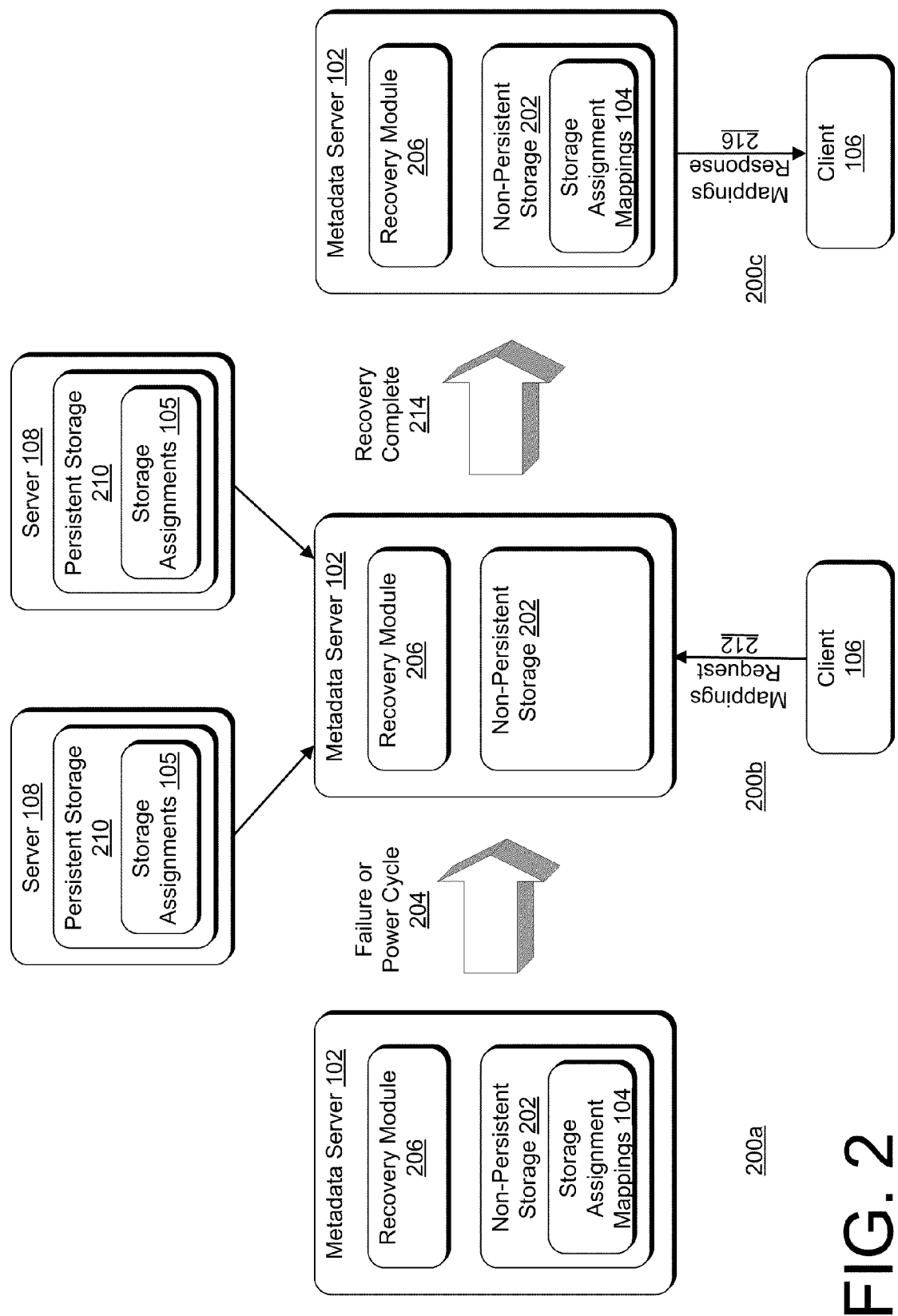
FIG. 2 illustrates a block diagram showing interactions of a metadata server, servers, and a client of a system during a metadata server failure or power cycle and a metadata server recovery process, in accordance with various embodiments.

FIG. 2 illustrates a block diagram showing interactions of a metadata server, servers, and a client of a system during a metadata server failure or power cycle and a metadata server recovery process, in accordance with various embodiments.

Three time periods 200*a*, 200*b*, and 200*c* are illustrated in FIG. 2. During time period 200*a*, the metadata servers 102 has not failed or undergone a power cycle. During time period 200*b*, the metadata server 102 has failed or undergone a power cycle and is engaged in a recovery process. During time period 200*c*, the metadata server 102 has completed the recovery process.

In various embodiments, time period 200*a* includes the above-mentioned system initialization phase as well as an operating phase. System initialization phases may include both bringing a new cluster of servers 108 and clients 106 online or mounting an existing cluster. Mounting an existing cluster, however, may involve collecting storage assignments 105 in the manner shown in time period 200*b*. In the system initialization phase, the metadata server 102 generates storage assignment mappings 104 in the manner described above, provides storage assignments 105 to servers 108, and stores the storage assignment mappings 104 in non-persistent storage 202 of the metadata server 102. Such non-persistent storage 202 may be system memory, such as random access memory (RAM) or some other form of volatile memory. Characteristically of volatile memory, the stored contents of the non-persistent storage 202, including the storage assignment mappings 104, are lost during a powering down or reboot. Also characteristically of volatile memory, the non-persistent storage 202 is faster then non-volatile, persistent memory. In some embodiments, the metadata server 102 also provides the storage assignment mappings 104 to clients 106 during the system initialization phase, either on its own initiative or responsive to client requests.

During an operating phase after the system initialization phase, the metadata server 102 responds to client requests for the storage assignment mappings 104 by providing the storage assignment mappings 104. The metadata server 102 also updates the storage assignment mappings 104 responsive to new servers 108 being added to the system 100 and responsive to failures of servers 108. The metadata server's 102 role in managing the recovery process for server failures is described further below with reference to FIG. 3. Upon updating the storage assignment mappings 104, the metadata server 102 provides the updated storage assignments 105 to servers 108 to ensure that the servers 108 have the correct, up-to-date list of the storage assignments 105 each is associated with. The metadata server 102 may also provide the updated storage assignment mappings 104 to clients 106, either on its own initiative or responsive to client requests.

In various embodiments, during an operating phase, the metadata server 102 fails or undergoes a power cycle 204. The failure 204 may have any sort of cause, such as loss of power or failure of a hardware or software component. A power cycle 204 is simply the powering down or rebooting of the metadata server 102, causing non-persistent storage 202 of the metadata server 102 to have its contents flushed. The recovery process of time period 200*b* begins when the metadata server 102 reboots or is brought back online. If a hardware or software component of the metadata server 102 failed, there may be a substantial time interval between the failure 204 and the beginning of the recovery process during time period 200*b*. During this time interval, the system 100 is not operational. To avoid this situation, the system 100 may use multiple devices as the metadata server 102, including a primary metadata server and some number of backup metadata servers, such as a secondary metadata server, in place of a single metadata server 102. Only the device serving the role of primary metadata server acts as the metadata server 102 at any given time. The secondary metadata server simply remains in a waiting state, ready to assume the primary metadata server role in case of a failure 204 of the device serving as the primary metadata server. In such embodiments where multiple devices are used for the metadata server 102, the time interval between the failure 204 and the recovery process of time period 200*b* may not be substantial.

During the recovery process of time period 200*b*, a recovery module 206 of the metadata server 102 performs the operations involved in the recovery of the metadata server 102. The recovery module 206 may be any one or more modules, algorithms, functions, threads, processes, or applications of the metadata server 102. The recovery module 206 initializes the recovery process automatically when the metadata server 102 boots up or is brought online. Upon initializing the recovery process, the recovery module 206 requests the storage assignments 105 that are stored in persistent storage 210 of the servers 108. As previously mentioned, the storage assignments 105 may be stored in the persistent storage 210 during one or both of a system initialization or an operating phase. Responsive to the requests, the servers 108 provide the storage assignments 105 to the metadata server 102. The recovery module 206 then rebuilds the storage assignment mappings 104 from the received storage assignments 105 and stores the storage assignment mappings 104 in the non-persistent storage 202. In some embodiments, the rebuilding may involve creating a table, ordering and assigning the storage assignments 105 to one of rows or columns, determining the number of server replicas to be associated with each storage assignment 105 based on the responses from the servers 108 and creating a number of columns or rows based on that determined number, and populating intersections of the server replicas and storage assignments 105 with identifiers of the servers 108. In one embodiment, the server responses may include not only storage assignments 105 but also indications of which server replicas those servers 108 were in the storage assignment mappings 104. Also, in some embodiments, the server responses may include indications of the latest version of the storage assignment mappings 104 known to the servers 108. The recovery module 206 may set the version information of the rebuilt storage assignment mappings 104 based on these version indications by, for example, incrementing the version specified in the indications. Upon completion of rebuilding the storage assignment mappings 104 and storing the rebuilt storage assignment mappings 104 in non-persistent storage 202, the metadata server 102 provides storage assignments 105 from the rebuilt storage assignment mappings 104 to the servers 108 and to clients 106 upon request. The recovery module 206 then determines that the recovery process is complete. If there are portions of the storage assignment mappings 104 without servers 108 assigned to them, then the metadata server 102 finds replacement servers 108 for the missing portions of the storage assignment mappings 104. This finding process may use the previously described failure recovery techniques.

In various embodiments, client requests 212 for storage assignment mappings 104 may be received during the failure/power cycle 204 or during the recovery process of time period 200*b*. If the request 212 is received during the recovery process, the metadata server 102 waits to answer the request 212 until the recovery process is complete. If the request 212 is received during a failure/power cycle 204, the client 106 will not receive a response to the request 212. In embodiments in which the metadata server 102 is a single device, the client 106 waits for a time period and resubmits the request 212. In embodiments in which the metadata server 102 is implemented using two devices, the client 106 waits for a time period and, not receiving a response, submits the request 212 to the secondary metadata server. Upon receiving the request 212, the secondary metadata server assumes the role of primary metadata server and a recovery module 206 of the secondary metadata server performs the above-described operations of the recovery module 206. When the former primary metadata server is rebooted or brought back online, it assumes the role of secondary metadata server.

In some embodiments, one of the servers 108 may fail during the recovery process of time period 200b. If such a failure occurs during the recovery process, the metadata server 102 waits to handle the server failure until the recovery process for the metadata server failure/power cycle 204 is complete.

During time period 200c, the system 100 may return to an operating phase. Time period 200c being upon completion 214 of the recovery process for the metadata server failure/power cycle 204. In time period 200c, the metadata server 102 responds 216 to requests 212 for the storage assignment mappings 104 received during the recovery process of time period 200b by providing the rebuilt storage assignment mappings 104. The metadata server 102 also handles failures of servers 108 that occurred during the recovery process of time period 200b.

Example Server Failure Scenarios

Figure 3:
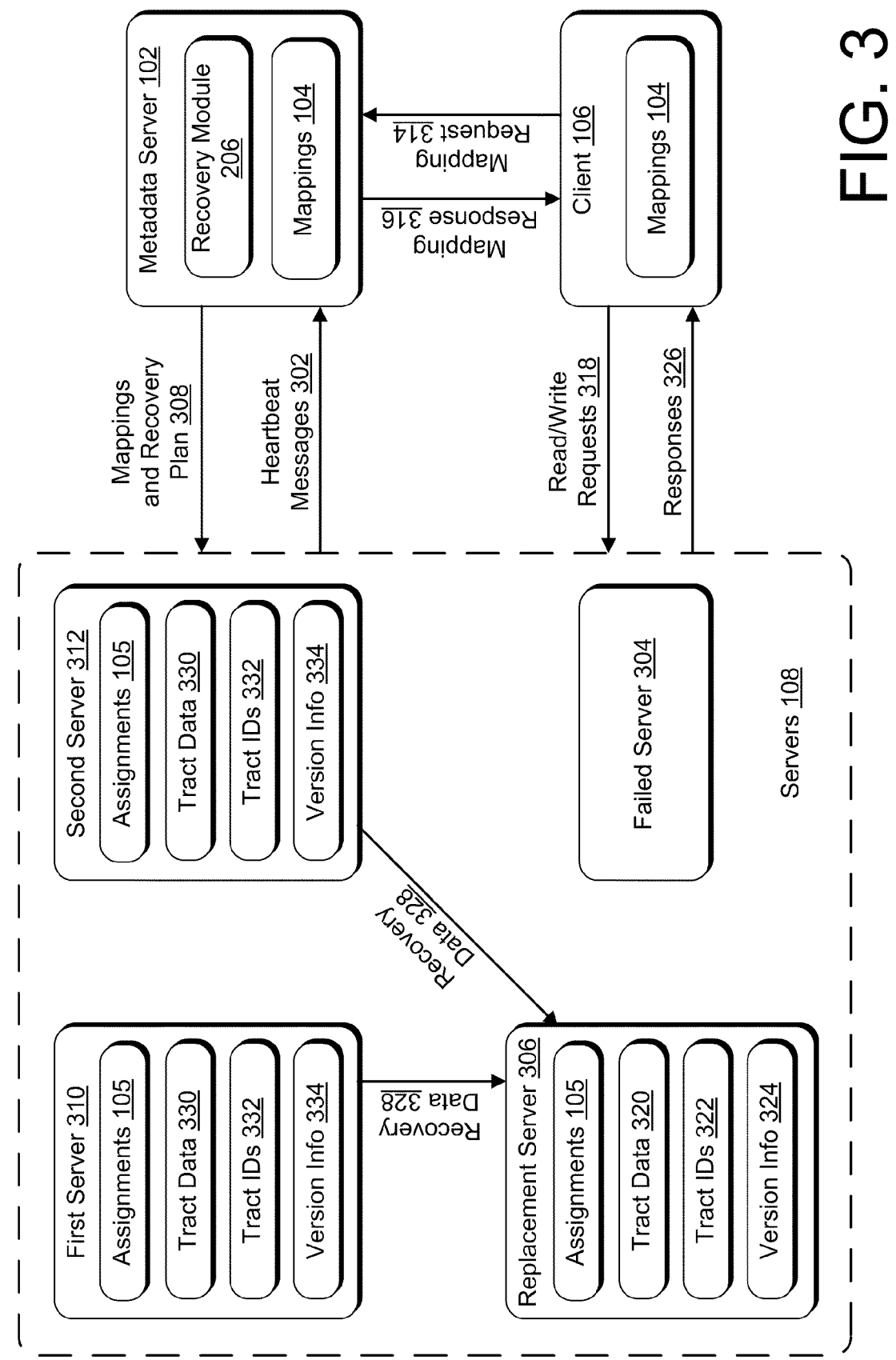
FIG. 3 illustrates a block diagram showing interactions of a metadata server, servers, and a client of a system during a server failure and a server failure recovery process, in accordance with various embodiments.

FIG. 3 illustrates a block diagram showing interactions of a metadata server, servers, and a client of a system during a server failure and server failure recovery process, in accordance with various embodiments. As illustrated the metadata server 102 receives heartbeat messages 302 from servers 108. The servers 108 may send these heartbeat messages 302 periodically or in response to requests from the metadata server 102. The heartbeat messages 302 are small control messages that identify themselves as heartbeat messages, include a timestamp associated with a time they were sent, and include identification of the sending server 108.

In various embodiments, the metadata server 102 determines that one of the servers 108 has failed when the metadata server 102 does not receive a threshold number of heartbeat messages 302. This threshold number may be one or more heartbeat messages 302. Alternatively, the metadata server 102 may be notified of the failure by a client 106 that did not receive a response from a server 108. Upon determining the occurrence of a server failure, the metadata server 102 invokes the recovery module 206. The recovery module 206 may be the same recovery module 206 described above with regard to FIG. 2 or may be a different recovery module 206 of the metadata server 102.

In some embodiments, the recovery module 206 initiates the recovery process by determining the storage assignments associated with the failed server 304 in the storage assignment mappings 104. For each storage assignment, the recovery module 206 selects a replacement server 306. The recovery module 206 may select a different replacement server 206 for each storage assignment, or select a different replacement server 102 for each storage assignment until all servers 108 have been selected once, an then select some servers 108 one or more other times as replacement servers 306. In some embodiments, different schemes for selecting replacement servers 306 may be used. Upon selecting replacement servers 306, the recovery module 206 proposes a recovery plan 308 to the servers 108. The recovery plan specifies the replacement server 306 for each storage assignment and the other servers 108 associated with each storage assignment. FIG. 3 represents a group of three servers 108 associated with a storage assignment 105, including the replacement server 306, a first server 310, and a second server 312, as well as the failed server 304 for that storage assignment 105. The servers 108 acknowledge their receipt of the recovery plan 308 by sending acknowledgement messages to the metadata server 102. The recovery module 206 then updates the storage assignment mappings 104, replacing entries for the failed server 304 with the selected replacement servers 306. The recovery module 206 also updates the version information of the storage assignment mappings 104 to indicate that the updated storage assignment mappings 104 are a new version of the storage assignment mappings 104. After updating the storage assignment mappings 104, the metadata server 102 provides the updated storage assignments 105 to the servers 108.

In various embodiments, the metadata server 102 receives requests 314 for the storage assignment mappings 104 from clients 106 during the recovery process for the server failure. The metadata server 102 responds to these requests by providing 316 the storage assignment mappings 104. The metadata server 102 transmits the storage assignment mappings 104 after the updating of the storage assignment mappings 104 and providing the storage assignments 105 to the servers 108 but while the recovery process is still ongoing. The metadata server 102 provides the storage assignment mappings 104 to the clients 106 while the recovery process is still ongoing to enable the clients 106 to operate during the recovery process.

Upon receiving the updated storage assignment mappings 104, a client 106 may make read and write requests 318 of servers 108, including read and write requests 318 of the replacement servers 308. The client 106 may send a read request 318 to a single one of the server replicas 108 for a given tract. If that server replica 108 is the replacement server 306 for the storage assignment associated with that tract, the replacement server 306 may not yet have received the requested tract from the other servers 310 and 312. If the replacement server 306 does not have the tract, the replacement server 306 instructs the client 106 to request 318 the tract from one of the servers 310 and 312.

The client 106 sends write requests 318 to all of the server replicas 108 storing or designated to store the tract included in the request 318. Alternatively, the client 106 sends write requests 318 to one or a subset of the server replicas 108 for processing and transmission to others of the server replicas 108. Each write request 318 may include tract data 320 for the tract being written, a tract identifier 322 for the tract being written, and version information identifying the version of the storage assignment mappings 104 being used by the client 106 when the client 106 issued the request 318. In some embodiment, the replacement server 306 receives the write request 318 from the client 106. Upon receiving the write request 318, the replacement server 306 stores the tract data 320, tract identifier 322, and version information 324 and sends a response 326 to the client 106 acknowledging the successful completion of the write request.

In some embodiments, the server 108 receiving the read or write request 318 examines version information 324 included in the request 318 and determines whether the client 106 is using out-of-date storage assignment mappings 104. If the client 106 is using out-of-date storage assignment mappings 104, the server 108 informs the client 106 of this to enable the client 106 to request an up-to-date version of the storage assignment mappings 104.

Also, in one embodiment, if the client 106 does not receive a response 326 to a certain number of requests 318 or receive a response 326 to a request 318 within a certain amount of time, the client 106 informs the metadata server 102 that the non-responsive server 108 has failed.

In various embodiments, the recovery module 206 also manages the recovery process from the providing of the updated storage assignments 105 to the servers 108 to the completion of the recovery process. This may include managing the writing of recovery data 328 from the first server 310 and second server 312 for each storage assignment to the replacement server 306 for that storage assignment. In some embodiments, this managing may comprise receiving confirmation when the writing of the recovery data 328 is complete. Upon receiving confirmations from all the groups of servers (i.e. first servers 310 and second servers 312) that the writing of the recovery data is complete, the recovery module 206 determines that the recovery process for the failed server 304 is complete.

The recovery data 328 written by the first server 310 and second server 312 may include data associated with one or more tracts corresponding to a storage assignment. Such data may include tract data 330, tract identifier 332, and version information 334. The version information 334 reflects the version of the storage assignment mappings 104 used when the tracts were written to the first server 310 and second server 312, not the version information associated with a current version of the storage assignment mappings 104 which may be in possession of the first server 310 and second server 312. The outcome of writing the recovery data 328 is that the first server 310 and second server 312 and the replacement server 306 have the same data with respect to the same tracts.

In some embodiments, allowing client 106 operation during the recovery process results in race conditions. For example, if a write request 318 including new data for an existing tract arrives at the replacement server 306 before the old data for that tract is received as part of the recovery data 328, the replacement server 306 may, in turn, store the new data and then overwrite it with the old data. The first server 310 and second server 312 may then subsequently receive write requests 318 including the new data, resulting in the servers 108 for that tract storing different data for the tract. The first server 310 and second server 312 will store the new data and the replacement server 306 will store the old data.

To avoid this potential inconsistency, the replacement server 306 first determines if any tract identifiers 332 included in the recovery data 328 match tract identifiers 322 of tracts currently stored by the replacement server 306. For each match that is found, the replacement server 306 compares the version information 334 and version information 324 associated with that tract. The replacement server 306 then conditionally overwrites the stored tract if the comparison indicates that the stored tract was written with an older version of the storage assignment mappings 104 than the version of the storage assignment mappings 104 which was used in writing the tract included in the recovery data 328. If the comparison indicates the same or older version of the storage assignment mappings 104 was used in writing the tract included in the recovery data 328, the recovery data 328 for that tract is discarded or stored in addition to the currently stored data for that tract. The reason for storing the older data is that such older data reflects what is also stored on the first server 310 and second server 312 and thus represents the data having consistent state on all server replicas 108 for that tract. Such older data may be used by the replacement server 306 in responding to read requests 318 until the replacement server 306 later receives messages from the first server 310 and second server 312 indicating that they have received and stored the new data.

Example Operations

Figure 4:
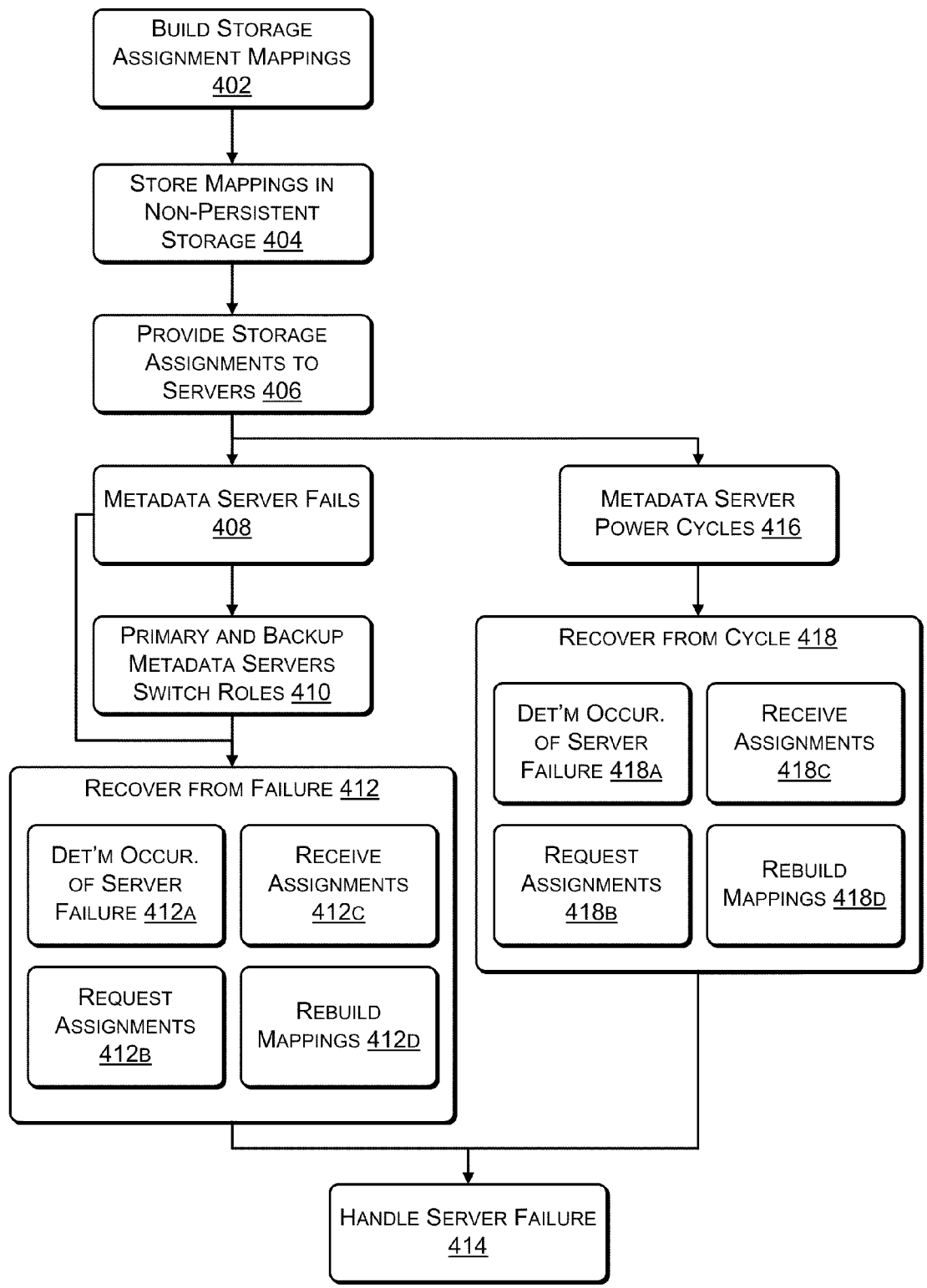
FIG. 4 illustrates a flowchart of example operations of a metadata server of a system for rebuilding storage assignment mappings from storage assignments from the storage assignment mappings received from other servers of the system, in accordance with various embodiments.

FIG. 4 illustrates a flowchart of example operations of a metadata server of a system for rebuilding storage assignment mappings from storage assignments received from other servers of the system, in accordance with various embodiments. As illustrated at block 402, the metadata server builds the storage assignment mappings for a system during a system initialization phase. Also during the system initialization phase, the metadata server stores, at block 404, the storage assignment mappings in non-persistent storage of the metadata server and provides, at block 406, the storage assignments to servers of the system to enable the servers to persistently store those storage assignments.

At block 408, the metadata server fails. In embodiments in which the metadata server comprises a primary metadata server and a secondary metadata server, the primary metadata server and secondary metadata server switch roles, at block 410, during and after a recovery from a failure of the primary metadata server.

At block 412, the metadata server recovers from the metadata server failure. At block 412a, the recovery includes determining the occurrence of a failure of another server of the system. The metadata server waits to handle this other failure until recovery from the metadata server failure is complete. At block 412b, the metadata server requests storage assignments from the servers of the system and, at block 412c, the metadata server receives those storage assignments. At block 412d, the metadata server rebuilds the storage assignment mappings from the storage assignments.

At block 414, with recovery complete, the metadata server handles the other server failure.

At block 416, rather than experiencing a failure, the metadata server undergoes a power cycle. As a result of the power cycle, the storage assignment mappings stored in the non-persistent storage of the metadata server is lost. The metadata server thus recovers from the power cycle at block 418. At block 418a, the recovery includes determining the occurrence of a failure of another server of the system. The metadata server waits to handle this other failure until recovery from the power cycle is complete. At block 418b, the metadata server requests storage assignments from the servers of the system and, at block 418c, the metadata server receives those storage assignments. At block 418d, the metadata server rebuilds the storage assignment mappings from the storage assignments. At block 414, with power cycle recovery complete, the metadata server handles the other server failure.

Figure 5:
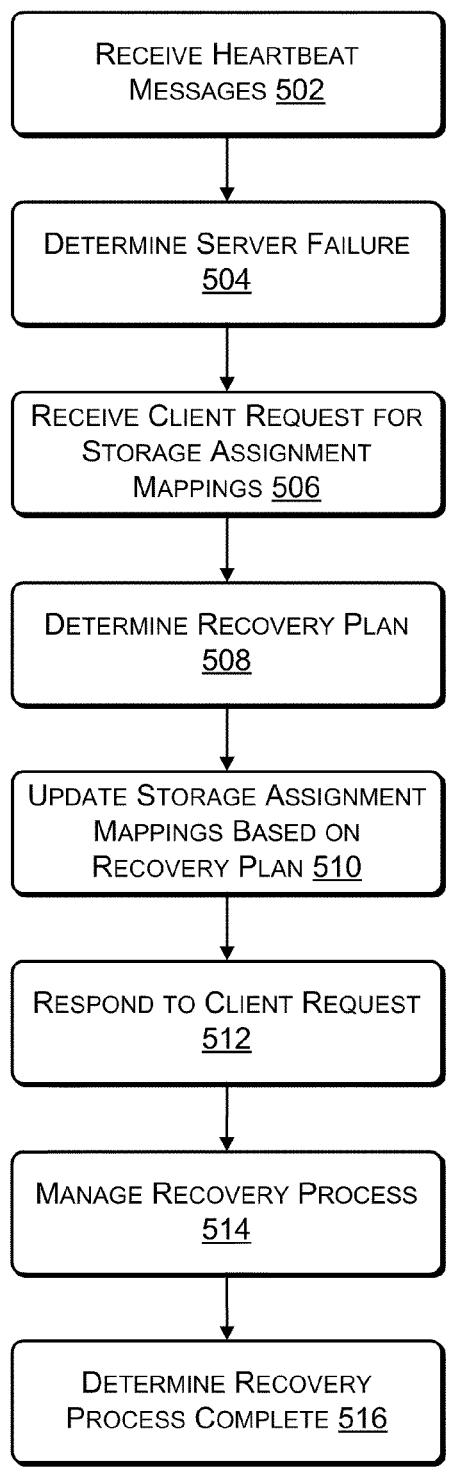
FIG. 5 illustrates a flowchart of example operations of a metadata server for enabling continued client operations during a recovery process, in accordance with various embodiments.

FIG. 5 illustrates a flowchart of example operations of a metadata server for enabling continued client operations during a recovery process, in accordance with various embodiments. As illustrated at block 502, the metadata server receives heartbeat messages from servers of the system. In response to determining that it has not received a threshold number of heartbeat messages from a server, the metadata server determines, at block 504, that the server has failed.

Upon determining that a server has failed, the metadata server initiates a recovery process. During that recovery process, the metadata server may receive, at block 506, a client request for storage assignment mappings. Before answering that request, the metadata server determines, at block 508, a recovery plan that specifies one or more replacement servers for the failed server. At block 510, the metadata server then updates the storage assignment mappings based on the recovery plan. At block 512, after updating the storage assignment mappings but while the recovery process is still ongoing, the metadata server responds to the client request by providing the client with the storage assignment mappings to enable the client to operate while the recovery process is ongoing. Also during the recovery process, the metadata server manages, at block 514, the recovery process, including managing writing of data by groups of servers of the system to replacement servers of the system, the data being stored by the groups of servers and the failed server. At block 516, the metadata server determines that the recovery process is completed when the groups of servers complete the writing of the data to the replacement servers.

Figure 6:
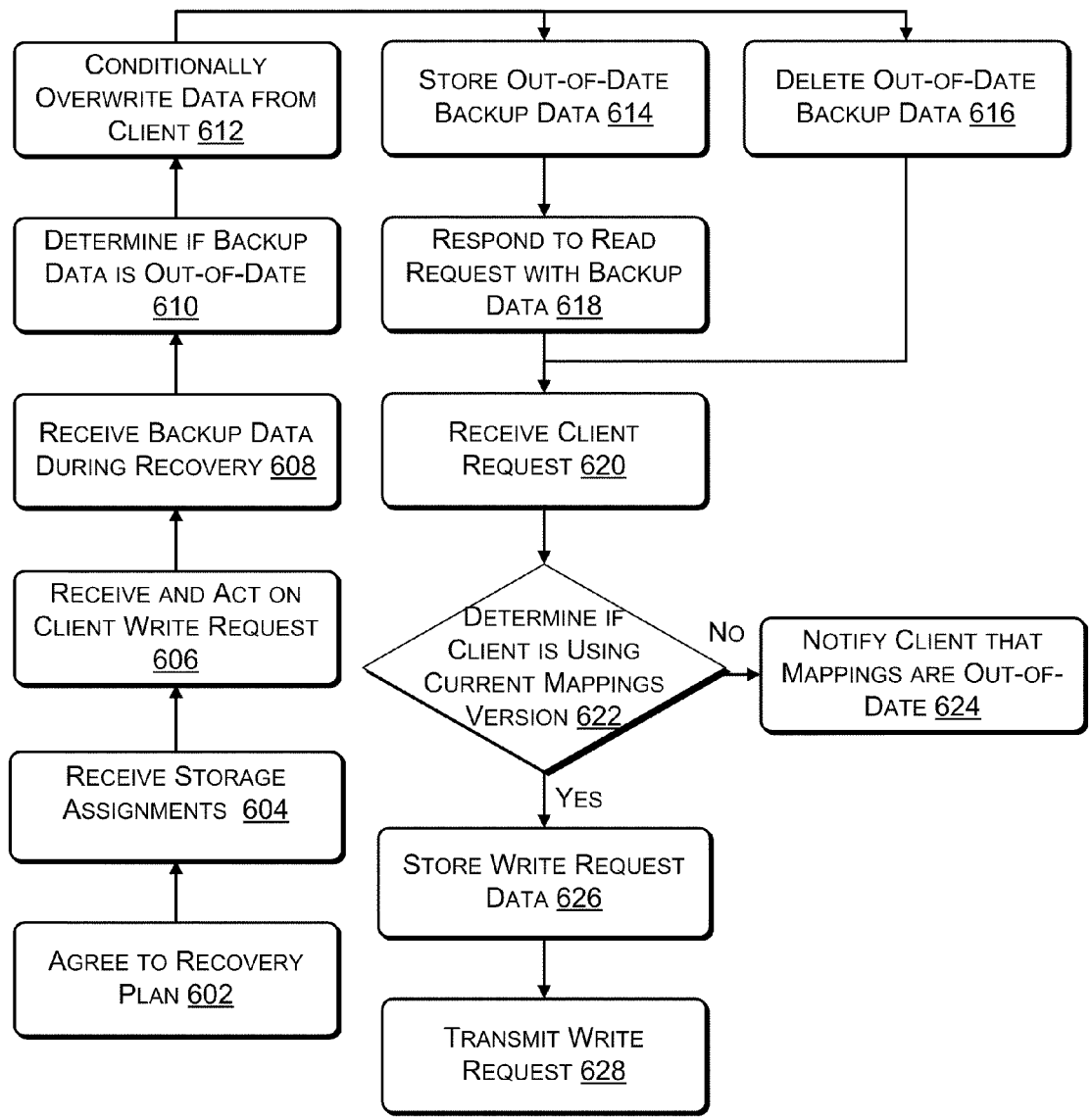
FIG. 6 illustrates a flowchart of example operations of a tract server for processing client requests and handling a recovery process, in accordance with various embodiments.

FIG. 6 illustrates a flowchart of example operations of a tract server for processing client requests and handling a recovery process, in accordance with various embodiments. As illustrated at block 602, the tract server agrees to a recovery plan proposed by a metadata server of the system. The recovery plan specifies that the tract server is a replacement server for a failed server. At block 604, the tract server receives the storage assignments and updates the storage assignments stored in persistent storage of the tract server based on the storage assignments now associated with the tract server in the updated storage assignment mappings.

At block 606, the tract server receives and acts on a client write request. This client write request is received while the recovery process is ongoing. The write request specifies tract data, an identifier associated with the tract data, and version information associated with the version of the storage assignment mappings used by the client in making the write request. The tract server stores this tract data, tract identifier, and version information.

At block 608, as part of the recovery process, the tract server receives backup data from other servers of the system. The tract server and these other servers are replicas for a tract of data, such as the tract of data included in the client write request. At block 610, the tract server determines if the backup data is out-of-date. The tract server does this by determining if the tract identifier included in the backup data matches a tract identifier stored at the tract server and, if so, comparing the version information associated with the stored tract data to the version information included in the backup data. For example, if the tract identifier included in the client write request matches the tract identifier included in the backup data, the tract server compares the version information stored with the tract data to version information included in the backup data. If the version information indicates that the backup data is associated with a newer version of the storage assignment mappings, the tract server overwrites, at block 612, the stored tract data. If the version information indicates that the backup data is associated with a same or older version of the storage assignment mappings, then the tract server either stores, at block 614, the backup data in addition to the already-stored tract data or, at block 616, deletes the backup data. At block 618, the tract server responds to read requests received during the recovery process with the stored backup data, even if that data is out-of-date, to ensure that the data being read is consistent across all server replicas for the tracts being read.

At block 620, subsequent to the recovery process, the tract server receives other client requests, which may include read requests, write requests, or both. At decision block 622, the tract server determines if the clients are using a current version of the storage assignment mappings by comparing version information included in the requests to the version of the storage assignment mappings known to the tract server. At block 624, if the determination indicates that the storage assignment mappings being used is out-of-date, the tract server notifies the clients that the storage assignment mappings used is out-of date. At block 626, if the determination indicates that the storage assignment mappings being used is current, the tract server processes the requests, storing write data and responding with requested tracts to read requests. At block 628, the tract server may also transmit write requests to other tract servers that are replicas for the tract included in the write request. This many only happen in certain configurations, such as configurations where a client writes to one tract server and that tract server writes to one or all of the other replica tract servers.

Example Computer System Architecture

FIG. 7 illustrates a block diagram showing components of a computer system 700 such as a metadata server 102, a client 106 or a server 108, in accordance with various embodiments. In various embodiments, computer system 700 may include at least one processing unit 702. The processing unit 702 may be any sort of processing unit. The processing unit 702 may also or alternatively include one or more graphic processing units (GPUs).

System memory 704 of the computer system 700 may store program instructions that are loadable and executable on the processor(s) 702, as well as data generated during the execution of these programs. Depending on the configuration and type of computing device, system memory 704 may be volatile (such as random access memory (RAM)) and/or non-volatile (such as read-only memory (ROM), flash memory, etc.). The computer system 700 may also include additional removable storage 712 and/or non-removable storage 714 including, but not limited to, magnetic storage, optical disks, and/or tape storage. The disk drives and their associated computer-readable media may provide non-volatile storage of computer readable instructions, data structures, program modules, and other data for the computing devices. In some implementations, the system memory 704 may include multiple different types of memory, such as static random access memory (SRAM), dynamic random access memory (DRAM), or ROM.

In some embodiments, in which the computer system 700 is a metadata server 102, the non-persistent storage 202 of the metadata server 102 may be volatile system memory 704 or other volatile memory or storage of the computer system 700. Also, in embodiments in which the computer system 700 is a server 108, the persistent storage 210 may be non-volatile memory or storage of the computer system 700.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. System memory 704, removable storage 712, and non-removable storage 714 are examples of computer storage media.

In contrast, communication media may embody computer readable instructions, data structures, program modules, or other data in a modulated data signal, such as a carrier wave, or other transmission mechanism. As defined herein, computer storage media does not include communication media.

As further shown in FIG. 7, the system memory 704 may store an operating system 706, program modules 708, and program data 710. The operating system 706 may be any sort of operating system or operating systems known in the art. The program modules 708 and program data 710 may include any one or more of the storage assignment mappings 104, the storage assignments 105, the tract data 112, the recovery module 206, the tract data 320, the tract identifiers 322, the version information 324, the tract data 330, the tract identifiers 332, or the version information 334, these components being described above in greater detail.

Computer system 700 may also have input device(s) 716 such as a keyboard, a mouse, a touch-sensitive display, voice input device, etc. Output device(s) 718 such as a display, speakers, a printer, etc. may also be included. These devices are well known in the art and need not be discussed at length here.

Computer system 700 may also contain communication connections 720 that allow the device to communicate with other computing devices 722. The communication connections 720 are implemented at least partially by network interface components. The other computing devices 722 may be any of the metadata server 102, the clients 106, or the servers 108. For example, the metadata server 102 may be a computing system 700 and a client may be another computing device 722 which communicates with the metadata server 102 using the communication connections 720.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A metadata server comprising:
    a processor; and
    a recovery module configured to be executed by the processor for implementation of a recovery process associated with a failure of a server of a system, the recovery module to:
        provide a new recovery plan to one or more replacement servers, the new recovery plan proposing the one or more replacement servers for replacement of the failed server;
        update previous storage assignment mappings associated with a previous recovery plan based on the new recovery plan such that new storage assignment mappings specify the one or more replacement servers as being associated with storage assignments of the failed server;
        transmit the new storage assignment mappings to one or more clients of the system during the recovery process to enable the one or more clients to operate during the recovery process;
        manage, during the recovery process, writing of a first instance of the data by servers of the system to the one or more replacement servers of the system, the first instance of the data being stored by the servers and the failed server and the first instance of the data being associated with a first version identifier;
        manage, during the recovery process, writing of a second instance of at least a portion of the data by the one or more clients to the one or more replacement servers of the system, the second instance of at least the portion of the data being associated with a second version identifier indicating that the second instance of at least the portion of the data is newer than corresponding data in the first instance of the data and
        store, in the one or more replacement servers and based at least in part the second version identifier, the second instance of at least the portion of the data instead of the corresponding data in the first instance of the data.

2. The metadata server of claim 1, wherein the recovery module is further configured to, during the recovery process:
    determine that the writing of the second instance of at least the portion of the data from the one or more clients to the one or more replacement services occurs before the writing of the corresponding data in the first instance of the data; and
    ensure that the corresponding data in the first instance of the data does not overwrite the portion of data in the second instance of the data.

3. The metadata server of claim 1, wherein the new storage assignment mappings are transmitted responsive to requests from the one or more clients.

4. The metadata server of claim 1, wherein the recovery module is further configured to periodically receive heartbeat messages from servers of the system and determine the occurrence of a server failure by noting a threshold number of missing heartbeat messages.

5. One or more computer storage devices comprising computer-executable instructions stored on the computer storage devices that are configured to program a tract server of a system to perform operations including:
    receiving first data from one or more other tract servers of the system as part of a recovery process, the first data being associated with a tract identifier and first version information corresponding to tract storage assignment mappings known to the one or more other tract servers, the tract storage assignment mappings associating storage assignments with tract servers of the system;
    determining that second data associated with the tract identifier is stored by the tract server, the second data being associated with second version information corresponding to the tract storage assignment mappings, the second version information being different than the first version information;
    determining whether the first version information or the second version information corresponds to an older version of the tract storage assignments mappings;
    in response to determining that the first version information corresponds to the older version of the tract storage assignment mappings, either storing the first data in addition to the second data or discarding the first data;
    in response to determining that the second version information corresponds to the older version of the tract storage assignment mappings, overwriting the second data with the first data; and
    providing the second data or the first data to a client of the system in response to a read request from the client that is received during the recovery process specifying the tract identifier.

6. The one or more computer storage devices of claim 5, wherein storage of the tract server maintains tracts of data, tract identifiers of those tracts of data, and version information associated with versions of the tract storage assignment mappings used by clients of the system at times the clients wrote the tracts of data to the tract server.

7. The one or more computer storage devices of claim 5, wherein the operations further include:
    comparing tract storage assignment mappings version information received in requests from clients of the system with tract storage assignment mappings version information used by the tract server; and
    in response to determining that an individual client is using the older version of the tract storage assignment mappings, notifying the individual client that a newer version of the tract storage assignment mappings is available.

8. The one or more computer storage devices of claim 5, wherein the operations further include:

receiving a write request;

storing data included in the write request; and transmitting the write request to the one or more other tract servers based at least in part on the write request or based at least in part on a newer version of the tract storage assignment mappings.

9. The one or more computer storage devices of claim 5, wherein the operations further include, prior to the receiving the first data, agreeing to a recovery plan proposed by a metadata server.

10. One or more computer storage devices comprising computer-executable instructions stored on the computer storage devices that are configured to program a tract server of a system to perform operations including:

receiving first data from one or more other tract servers of the system as part of a recovery process, the first data being associated with a tract identifier and first version information corresponding to tract storage assignment mappings known to the one or more other tract servers, the tract storage assignment mappings associating storage assignments with tract servers of the system;

determining that second data associated with the tract identifier is stored by the tract server, the second data being associated with second version information corresponding to the tract storage assignment mappings, the second version information being different than the first version information;

determining that the second version information corresponds to an older version of the tract storage assignment mappings compared to the first version information;

in response to determining that the second version corresponds to the older version of the tract storage assignment mappings, overwriting the second data with the first data;

receiving tract storage assignment mappings version information in a request from a client of the system;

comparing the tract storage assignment mappings version information received in the request from the client of the system with the first version information corresponding to the tract storage assignment mappings used by the tract server; and in response to determining that the tract storage assignment mappings version information received in the request from the client includes the older version of the tract storage assignment mappings, notifying the client that an updated version of the tract storage assignment mappings is available.

11. The one or more computer storage devices of claim 10, wherein storage of the tract server maintains tracts of data, tract identifiers of those tracts of data, and version information associated with versions of the tract storage assignment mappings used by clients of the system at times the clients wrote the tracts of data to the tract server.

12. The one or more computer storage devices of claim 10, wherein the operations further include:

receiving a write request;

storing data included in the write request; and transmitting the write request to the one or more other tract servers based at least in part on the write request or based at least in part on a newer version of the tract storage assignment mappings.

13. The one or more computer storage devices of claim 10, wherein the operations further include, prior to the receiving the first data, agreeing to a recovery plan proposed by a metadata server.

* * * * *